July 8, 1930.  C. H. FOSTER  1,770,031
SHOCK ABSORBER
Filed April 30, 1926    3 Sheets-Sheet 1
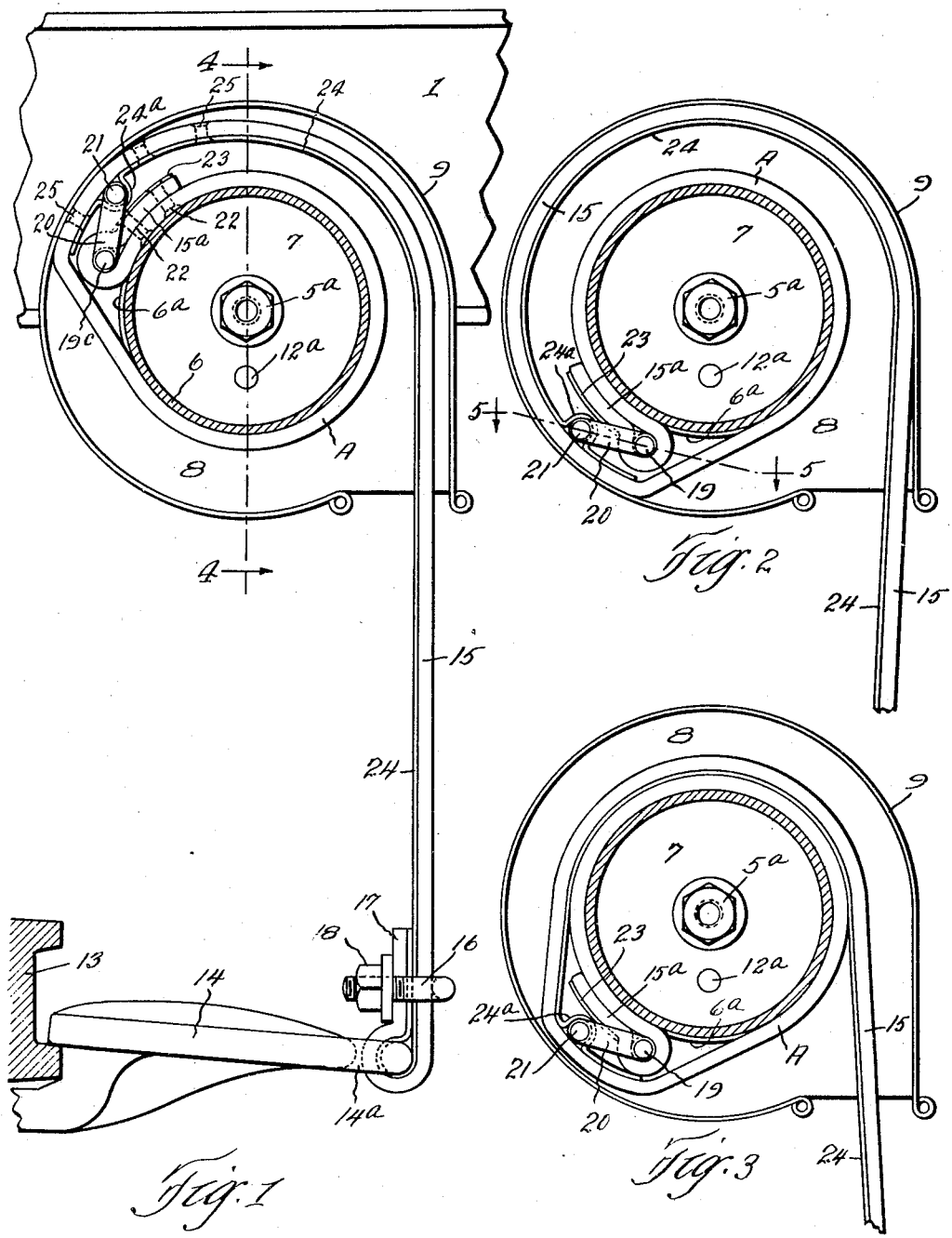
INVENTOR
Claud H. Foster,
By Hull, Brock West,
Attys.

July 8, 1930.　　　　C. H. FOSTER　　　　1,770,031
SHOCK ABSORBER
Filed April 30, 1926　　　3 Sheets-Sheet 2
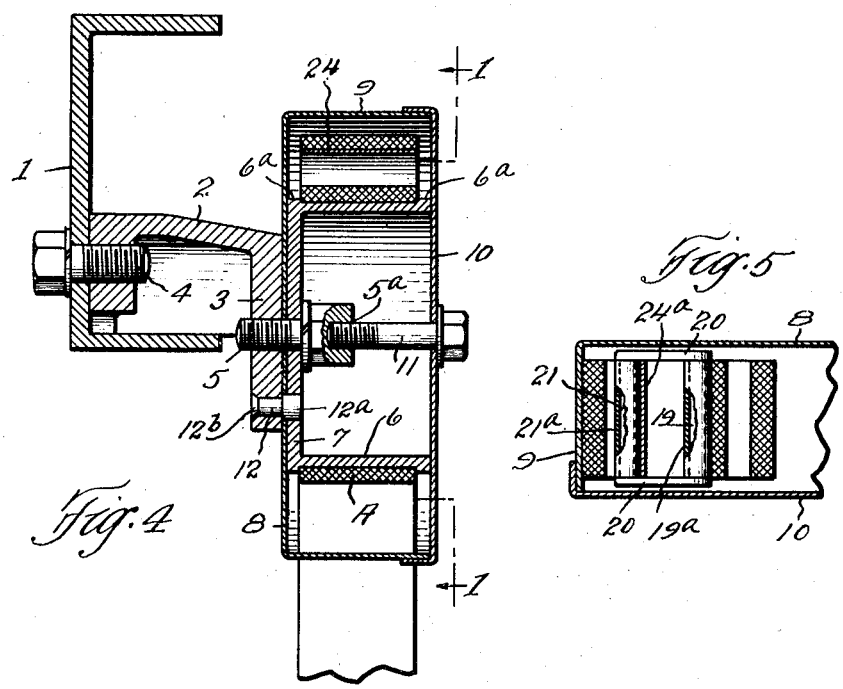
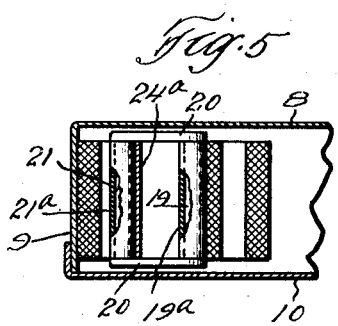
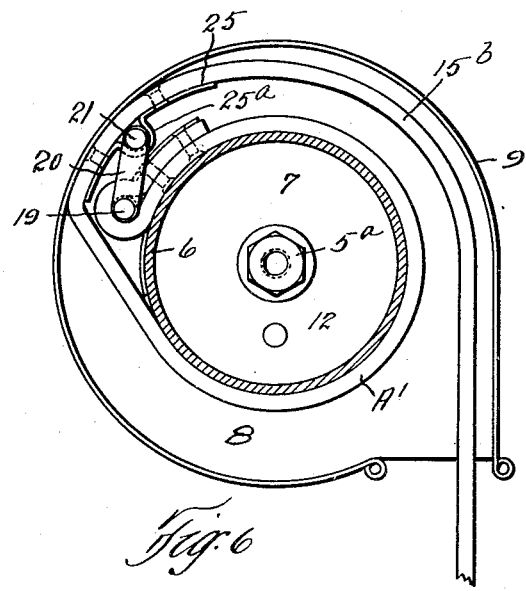
INVENTOR
Claud H. Foster
By Hull, Buck & West.
Attys.

July 8, 1930.  C. H. FOSTER  1,770,031
SHOCK ABSORBER
Filed April 30, 1926   3 Sheets-Sheet 3
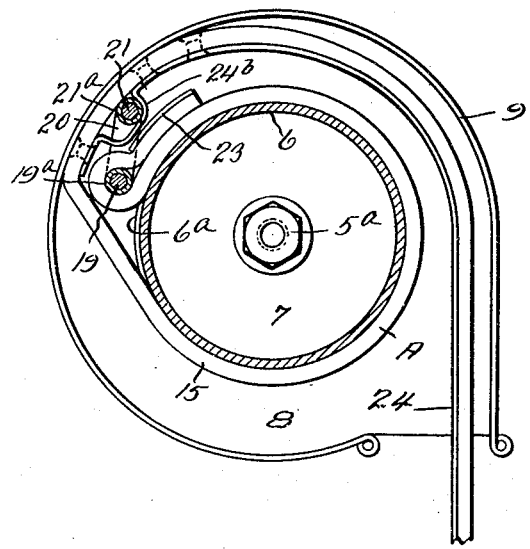
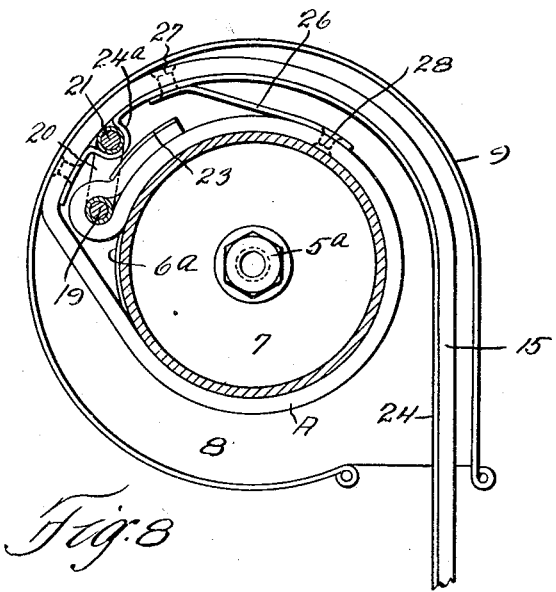
INVENTOR
Claud H. Foster
BY Hull, Brock & West,
Attys.

Patented July 8, 1930

1,770,031

UNITED STATES PATENT OFFICE

CLAUD H. FOSTER, OF WICKLIFFE, OHIO

SHOCK ABSORBER

Application filed April 30, 1926. Serial No. 105,620.

This invention relates to shock-absorbing devices such as are interposed between the axles and frames of vehicles for the purpose of reducing the extent of vibration or relative movement of such parts, whereby excessive movement of and injury to the springs of such vehicles is prevented and the comfort of the occupants of the vehicles is enhanced.

Among the general objects of the invention are the following:—to provide a device of this character which can be produced at low cost; which is simple of construction; which is capable of quick and convenient application to and removal from the parts with which it is associated; which can be conveniently adjusted; and which is efficient in operation.

I realize the foregoing advantages in and through a construction of shock absorber in which the braking action of a flexible band upon a drum is secured, but without the necessity for employing a spring for the purpose of resisting or assisting to resist the separation of the axle and frame during the upward or rebound movements of the frame, or of restoring or resetting the band or strap to its initial position upon the drum as the axle and frame approach each other.

The present preferred embodiments of my invention are shown in the drawings forming part hereof, wherein Fig. 1 represents a sectional side elevation of my shock-absorbing device as used with a vehicle frame and axle and showing the positions of the parts under ordinary riding conditions, the section through the casing corresponding to the line 1—1 of Fig. 4; Fig. 2 a view similar to Fig. 1, the axle being omitted, and showing the positions of the parts when the frame and axle approach each other; Fig. 3 a view similar to Fig. 2, showing the positions of the parts when the vehicle frame and axle are separated; Fig. 4 a sectional detail view corresponding to the line 4—4 of Fig. 1; Fig. 5 a sectional detail corresponding to the line 5—5 of Fig. 2; and Figs. 6, 7 and 8 sectional details, similar to Fig. 1 and showing modified forms of my invention.

Describing the various parts by reference characters, 1 denotes one of the side members of a vehicle frame, such member being shown as of the ordinary channel construction. Secured to the member 1 is an angular bracket 2, 3, one or more bolts 4 connecting the part 2 of the bracket to the said member. Secured to the depending branch 3 of the bracket, by a bolt 5, is a brake drum the cylindrical wall of which is indicated at 6. The bottom or inner wall 7 is provided with a central aperture for the bolt 5. The drum is provided with a single head 7, the outer end of the drum being open. Between the head 7 and the depending flange 3 of the angular bracket is inserted the bottom wall or head 8 of a housing, preferably of sheet metal, the said housing having a cylindrical wall 9 and an outer head or cover 10 which is shown as secured in place across the open end of the drum by means of a bolt 11 having the inner end threaded into a central aperture $5^a$ in the head of the bolt 5. For the purpose of preventing the drum from rotating about the bolts 5 and 11, an eccentrically located stud 12 is provided, which is shown as having a head $12^a$ at one end adapted to enter a corresponding aperture in the head 7 of the drum, the opposite end of the stud being shown as expanded or riveted to the vertical flange 3 of the angle bracket, as shown at $12^b$.

13 indicates the axle, which may be of the ordinary I-beam type. Secured to this axle in any suitable manner is an arm 14 having at one end a slot $14^a$ by means of which one end of a flexible brake-band strap member 15 is secured to said arm and, through said arm, to the axle 13. A convenient manner of securing the end of said strap member to said arm is to pass the lower end thereof through the slot $14^a$ and to clamp such end against the body of the strap member as by means of a U-bolt 16, a bearing plate 17, and nuts 18.

The strap member 15 extends around the cylindrical wall 6 of the drum and is connected at its inner end to the cross-pin 19 at one end of a pair of links 20, the opposite ends of which are connected to a cross pin 21. A convenient manner of connecting the strap to the cross pin 19 is by bighting the end of the strap about said pin and fastening such end to the portion of the strap therebeneath, as by rivets 22. To insure a lasting connection, the outer face of the end portion 15ª of the strap is provided with a sheet metal facing 23 through which the rivets extend. Each pin 19, 21 is surrounded by a sleeve, indicated respectively at 19ª and 21ª, said sleeves serving to space apart the side members 20 of the links.

The strap member 15 is formed into a loop extending from the bighted end thereof almost entirely about the drum and in engagement therewith. Instead of being wrapped upon this loop, the part of the strap member that forms a continuation of the loop and which extends in the same general direction as the loop, is spaced therefrom in the following manner.

The outer cross pin 21 of the links is shown as connected to the part of the strap member 15 which forms such continuation of the loop by means of a spring-metal strap member 24 which is provided near the end thereof with a U-shaped bearing 24ª, within which and below the inner face of the strap member 15 the said cross pin is received. The strap member 24 is fastened to the strap member 15 by rivets 25.

It will be noted that the spring-metal strap member 24 extends down along the face of the strap member 15 which is presented toward the drum, with the member 24 on the inner curved side of the member 15, the member 24 being also passed through the slot 14ª and secured thereto by the bolt 16. The side edges of the drum are provided with circumferential flanges 6ª providing a seat for the brake band A formed by the loop of the strap member 15.

With the parts constructed and arranged as described, the operation will be as follows, it being understood that, when the parts are in the positions shown in Fig. 1, the vehicles body and axle are in the relative positions which they occupy under ordinary running conditions on smooth roads.

During movements of small amplitude of the body and axle toward and from each other, there will be no rotation of the drum-engaging loop A of the strap member 15 about said drum. As the axle moves upwardly, the composite strap 15, 24 will be moved upwardly, but the clearance between the same and the casing 9 will allow relative movements of the axle and frame, sufficient to accommodate small irregularities in the road bed, without rotating the brake band formed by the loop A, upon the drum. There will be a certain range of movement, predetermined by the clearance between the composite strap 15, 24 and the casing 9, on the one side, and between such part of the strap and the brake band formed by the loop A on the other side, which will accommodate such movements or vibrations as may be readily absorbed by the tires and the vehicle springs without rotating the brake-band or loop, there being a larger clearance in the case of vehicles equipped with balloon tires than in the case of vehicles equipped with ordinary high-pressure tires. When, however, a more severe obstruction is encountered, the composite strap 15, 24 will act in the manner shown in Fig. 2, the strap member 15 engaging the inner surface of the housing 9 and following around such surface in a counter-clockwise direction. This produces a thrust, acting through the pin 21, links 20 and pin 19 upon the brake-band or loop A, to loosen the said band or loop and rotate it in a counter-clockwise direction. Upon the reverse movement of the axle, following such upward movement, the composite strap 15, 24 will be drawn downwardly, thrusting the bighted end of the strap member 15 therebelow against the drum and causing the pull of the strap to tighten the loop A upon the drum. Further downward movement of the axle will pull the pin 21 into engagement with the part 23 therebelow, further clamping the inner end of the brake-band or loop A upon the drum; and still further downward movement of the axle will cause the strap 15, 24 to engage the outer surface of the brake band or loop, as shown in Fig. 3. The brake band or loop will be clamped progressively more tightly about the drum by the slight tendency of the pin 19 to be moved toward the left, by the thrust of the pin 21 against the part of the loop therebeneath, and by the frictional contact between the strap 15, 24 and the outer face of the loop. It follows, from this construction, that the harder and quicker the downward jerk upon the strap 15, 24, the greater will be the friction which is exerted by the brake-band A upon the brake drum and the more quickly will this friction be applied to the drum.

In Fig. 6 there is shown a modification of the invention disclosed in the preceding views, wherein the strap 15ᵇ, instead of being a composite strap, is made of a single strap possessing sufficient rigidity to enable the loop A' to be moved about the drum 6 counter-clockwise when the axle and vehicle body are in sufficient proximity to each other. I have found that, by treating a fabric strap with stiffening mateiral, such as shellac, sufficient rigidity will be imparted thereto to enable the loop A' to be rotated about the drum in the manner shown in Fig. 2 and without the necessity for the additional strap member 24. In this case, the pin 21 is pivotally secured to the strap 15ᵇ in the same manner as is the case with the preceding views, using for this purpose a short length of sheet metal 25, with a looped bearing 25ª receiving the pin 21 and the spacing sleeve 21ª. The pin 19 and spacing sleeve 19ª are secured to the upper end of the strap 15ᵇ in the same manner as shown in the preceding views.

In Fig. 7 there is shown a still further modification of my invention, which differs from the form shown in Figs. 1–5 in providing the strap member 24 with an enlongated looped bearing 24$^b$ for the pin 21 and the spacing sleeve 21$^a$, the other parts being identical with those shown in the said preceding views and being identified by like numerals. The provision of the elongated looped bearing 24$^b$ for the pin 21 and spacing sleeve 21$^a$ accommodates the diminution in thickness of the part of the strap member 15 employed in the loop A, due to the wear of such loop upon the brake drum. This diminution of thickness would cause the left hand or inner end of the loop to move to the left, and elongated bearing 24$^b$ will enable the pin 21 to move to the left to accommodate this condition.

In Fig. 8 there is shown a still further modification of the invention, wherein the arrangement of the parts is identical with that shown in Figs. 1–5 inclusive, but a flexible band or strip 26 is connected at one end to the strap 15, 24, adjacent to the bearing loop 24$^a$, as by means of one or more rivets 27, the opposite end being connected to the loop A by one or more rivets 28. This band or strip will facilitate the movement of the loop A in a counter-clockwise direction about the drum.

In all forms of my invention the brake band formed by the loop A is moved freely upon the drum in a counter-clockwise direction by a thrust exerted upon the inner end of the band or loop by the portion of the strap interposed between the same and the housing; and in all forms of my invention, the brake band or loop A is held upon and in operative relation to the drum by the link connection between the inner end of the band or loop and the operating portion of the strap 15, 24 or 15$^b$. Furthermore, in all forms of my invention, the connection between the operating part of the strap and the band includes one or more projections (the loop of the end of the strap member 15 about the pin 19 and the pin 21 and the parts 15$^a$ and 23) which enable the strap to grip the loop quickly and firmly to the drum when the strap is pulled out of the housing by rebound of the axle and frame after an approach sufficient to rotate the loop upon the drum.

Having thus described my invention, what I claim is:—

1. A shock absorber comprising a drum, a housing for said drum, spaced therefrom, a strap entering said housing and looped about said drum and having a portion interposed between such loop and the housing, and a link connection between the end of the loop and the aforesaid portion of the strap, the said strap being flexible but possessing sufficient rigidity to rotate the loop on the drum through the thrust of said strap upon said link connection.

2. A shock absorber comprising a drum, a housing for said drum, spaced therefrom, a strap entering said housing and looped about said drum and having a portion interposed between such loop and the housing, and connections between the end of said loop and the aforesaid portion of the strap whereby the grip of the loop on the drum will be relaxed and the loop rotated in one direction upon the drum by movements of the said portion of the strap in one direction and the grip of the loop upon the drum will be increased by movements of said portion of the strap in the opposite direction, the said strap being flexible but possessing sufficient rigidity to so rotate the loop on the drum through the thrust of said strap in a direction toward said connections.

3. A shock absorber comprising a drum, a housing for said drum, spaced therefrom, a flexible strap member entering said housing and looped about said drum and having a portion interposed between such loop and the housing, connections between the said loop and the aforesaid portion of the strap whereby the grip of the loop on the drum will be relaxed and the loop rotated in one direction upon the drum by movements of a predetermined extent of the said portion of the strap member in one direction and the grip of the loop upon the drum will be increased by movements of a predetermined extent of the said portion of the strap member in the opposite direction, and a resilient strap member cooperating with the first strap member to impart sufficient rigidity to the strap formed thereby to so rotate the loop on the drum through the thrust of said strap in a direction toward said connections.

4. In a shock absorber, the combination of a drum, a housing for said drum, a strap having a portion looped about said drum and a portion extending about a portion of such loop and between the same and the housing, and a link connection between the end of the loop and the portion of the strap surrounding and adjacent thereto, the said strap being flexible but possessing sufficient rigidity to move the loop about the drum when sufficient thrust is exerted against the strap, in a direction toward said link, to cause the strap to engage the housing.

5. In a shock absorber, the combination of a drum, a housing for said drum, a strap having a portion looped about said drum and a portion extending about a portion of such loop and between the same and the housing, and a connection between the end of the loop and the portion of the strap surrounding and adjacent thereto whereby the grip of the loop on the drum will be relaxed by a movement of the strap toward such connection and will be increased by a movement of the strap from such connection, the said strap being flexible but possessing sufficient rigidity to move the loop about the drum when sufficient thrust is exerted against the strap, in a direction toward said connection, to cause the strap to engage the housing.

6. The combination, with a vehicle frame member and an axle member, of a shock absorber comprising a drum secured to one of said members, a housing for said drum, a flexible strap member secured to the other vehicle member and extending into the housing and formed into a loop extending about the drum, with a portion of said strap member interposed between an end portion of said loop and the drum, a resilient strap member secured to the first strap member and forming a strap therewith extending into the housing and terminating short of the loop, a connection between the end of the loop and the portion of the strap between the same and the housing, the strap possessing sufficient rigidity to move the loop about the drum, through such connection, by movements of the said members toward each other in excess of a predetermined amplitude.

7. The combination, with a vehicle frame member and an axle member, of a shock absorber comprising a drum secured to one of said members, a housing for said drum, a strap secured at one end to the other member and having its opposite end looped about said drum, with a portion of said strap surrounding a portion of such loop and interposed between the same and the said casing, a pin pivotally connected to the portion of the strap surrounding the said loop, a pin extending through a bearing formed at the end of the said loop, and links connecting said pins, the said strap being of flexible material but possessing sufficient rigidity to rotate the loop freely about said drum as the said members approach each other and serving to force the first mentioned pin into operative engagement with the part of the loop therebeneath through movements of the said members in opposite directions.

8. The combination, with a vehicle frame member and an axle member, of a shock absorber comprising a drum secured to one of said members, a housing for said drum, a strap secured at one end to the other member and having its opposite end looped about said drum, with a portion of said strap surrounding a portion of such loop and interposed between the same and the said housing, the portion of the strap which surrounds the end portion of the loop being provided with a bearing, a cross pin journaled in said bearing, a bearing at the inner end of said loop, a cross pin journaled in such loop bearing, and links connected to the said cross pins, the strap being of flexible material but possessing sufficient rigidity to rotate the looped portion thereof about the drum through the thrust exerted upon the first mentioned pin by the relative movements of the said members toward each other, the arrangement being such that the bearing for the first-mentioned pin will be forced into light engagement with the portion of the loop therebeneath through a pull upon the strap due to the separating movements of the said members.

9. The combination, with a vehicle frame member and an axle member, of a drum secured to one of said members, a housing for said drum, a strap member of flexible material connected at one end to the other of said members and having its other end wrapped or looped about said drum, with a portion of said strap extending about a portion of such loop and normally interposed between the same and the housing, a link connection between the end of the loop and the portion of the strap located exteriorly thereof, and a resilient strap member cooperating with the first mentioned strap member to move the looped portion of the first strap member about the drum as the said members approach each other.

10. The combination, with a vehicle frame member and an axle member, of a drum secured to one of said members, a housing for said drum, a strap member connected at one end to the other of the first two members and having its other end wrapped or looped about said drum, with a portion of the said strap member extending about a portion of such loop and normally interposed between the same and the housing, a link connection between the end of the loop and the portion of the strap member located exteriorly thereof, and a resilient strap connecting a portion of the strap member which is located above the loop, and between the same and the housing, with a portion of the loop.

11. A shock absorber comprising a drum, a strap having one end formed into a loop engaging said drum and having a portion forming a continuation of said loop and extending in the same general direction as said loop and surrounding a portion thereof, and a thrust connection between such end and such surrounding portion.

12. A shock absorber comprising a drum, a strap having one end formed into a loop engaging said drum and having a portion forming a continuation of said loop and extending in the same general direction as said loop and surrounding a portion thereof, and a thrust connection between such end and such surrounding portion, the said strap being flexible but possessing sufficient rigidity to rotate the loop on the drum through the thrust exerted thereby upon the end of the strap through said thrust connection.

13. A shock absorber comprising a drum, a strap having one end formed into a loop engaging said drum and having a portion forming a continuation of said loop and extending in the same general direction as the loop and surrounding a portion thereof, a thrust connection between such end and such surrounding portion of the strap, said strap being flexible but possessing sufficient rigidity to rotate the loop on the drum through the thrust exerted thereby upon the end of the strap through said thrust connection, and a member spaced from the drum and adapted to be engaged by the said strap as the vehicle members to which the shock absorber is attached approach each other thereby to apply the thrust of the strap to the said thrust connection.

In testimony whereof, I hereunto affix my signature.

CLAUD H. FOSTER.